United States Patent
Pillay (10) Patent No.: US 8,949,162 B1
(45) Date of Patent: Feb. 3, 2015

(54) CUSTOMER EXPERIENCE IN NETWORK-BASED SERVICES

(75) Inventor: Suvenderan Pillay, Western Cape (ZA)

(73) Assignee: Amazon Technologies, Inc., Seattle, WA (US)

( * ) Notice: Subject to any disclaimer, the term of this patent is extended or adjusted under 35 U.S.C. 154(b) by 218 days.

(21) Appl. No.: 13/536,456

(22) Filed: Jun. 28, 2012

(51) Int. Cl.
*G06N 5/00* (2006.01)

(52) U.S. Cl.
USPC .......................................................... 706/45

(58) Field of Classification Search
None
See application file for complete search history.

(56) References Cited

U.S. PATENT DOCUMENTS 8,332,517 B2 * 12/2012 Russell ........................ 709/226
2012/0196644 A1 * 8/2012 Scherzer et al. .............. 455/524

* cited by examiner

*Primary Examiner* — Alan Chen
(74) *Attorney, Agent, or Firm* — Lee & Hayes, PLLC (57) ABSTRACT

Disclosed herein are systems, devices, and techniques for using collective intelligence to improve a customer's experience when using network-based services. Data generated as a byproduct of one or more customer interactions with the network-based service may be repeatedly gathered, optionally stored, and analyzed to generate collective intelligence information. This collective intelligence information may be compared to various assessed parameters associated with a characteristic (i.e., a type and/or a configuration) of a computer resource(s), parameters associated with a state of the network-based service provider environment, and/or a customer experience criterion specified by the customer.

24 Claims, 6 Drawing Sheets

CUSTOMER EXPERIENCE IN NETWORK-BASED SERVICES

BACKGROUND

Large-scale, network-based computing represents a paradigm shift from traditional client-server computing relationships. With large-scale, network-based service provider environments (e.g., data centers), customers are able to leverage shared resources on-demand by renting resources that are owned by third parties and that reside "in the cloud." With these resources, users of the network-based service provider environment are able to launch and maintain large applications, or computer resources, without actually owning or servicing the underlying infrastructure necessary for these applications.

In order to use a network-based service provider environment, a user or customer typically instantiates a virtual machine or accesses a network-based service, (also referred to herein as a "computer resources"). One example of such a computer resource is a virtual machine (also referred to herein as "virtual machine instances"). Each computer resource is a software implementation of a computing system that executes programs like a physical computer system and is configured to run an operating system and execute customer-installed programs or applications.

Because customers with diverse needs may create and/or use computer resources of varying characteristics, such as types (i.e., computer resource capabilities) and configurations (e.g., operating system version, security, network access, etc.), customers may experience different levels of service. Furthermore, varying system states of the network-based service provider environment creates even more variation in levels of service with respect to the time required to execute, and the performance of, network-based services.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes systems, devices, and techniques for using collective intelligence to improve a customer's experience when using network-based services such as those offered by a network-based service provider.

Network-based services may include services such as cloud computing services, network-based storage services, network-based database services, web hosting services, and the like. Over time, as customers of a network-based service provider use computer resources offered by the service provider data is generated as a byproduct of the customers' interaction with the network-based services. Such data may include, but is not limited to, information based on the amount of time it takes to service requests, the amount of excess compute capacity, the amount of excess bandwidth, internal network latency, options selected by the customer, details of booting, creating, launching, and/or terminating computer resources (e.g., running time of a virtual machine, type or amount of traffic received, launch count of virtual machines, number of customers of computer resources, etc.), and the like. This data may be repeatedly or continuously gathered, stored and analyzed to generate collective intelligence information that may be utilized for the purpose of improving any given customer's experience when using one or more network-based services. This collective intelligence information may prove very useful to the network-based service provider offering one or more network-based services, for example, who desires to provide its customer base with accurate predictions of customer experience, and/or provide the customer base with quality recommendations or ratings of products and/or services.

In one example, users that interact with a compute service operating within a service provider environment to create or launch virtual machines (also referred to herein as "virtual machine instances"), may receive respective passwords from one or more computer systems operating within the network-based service provider environment. The network-based service provider environment may include one or more computer systems configured to determine and store data relating to an amount of time for generating, encrypting and serving the passwords to each user. The computer systems within the network-based service provider environment may also store, in association with this data, parameters associated with the characteristics of the virtual machine instances as well as parameters associated with the state of the services (e.g., a compute service, database service, storage service, etc.) as well as one or more networks internal to the network-based service provider environment in order to generate collective intelligence information. In a specific example, in the instance where a user specifies characteristics of a virtual machine instance to launch within the network-based service provider environment, the one or more computer systems are able to compare parameters of the user's virtual machine instance and the state information with at least a portion of the collective intelligence information to predict and communicate to the user a time period that will be required for generating, encrypting and serving the user's password.

Example Architecture

Figure 1:
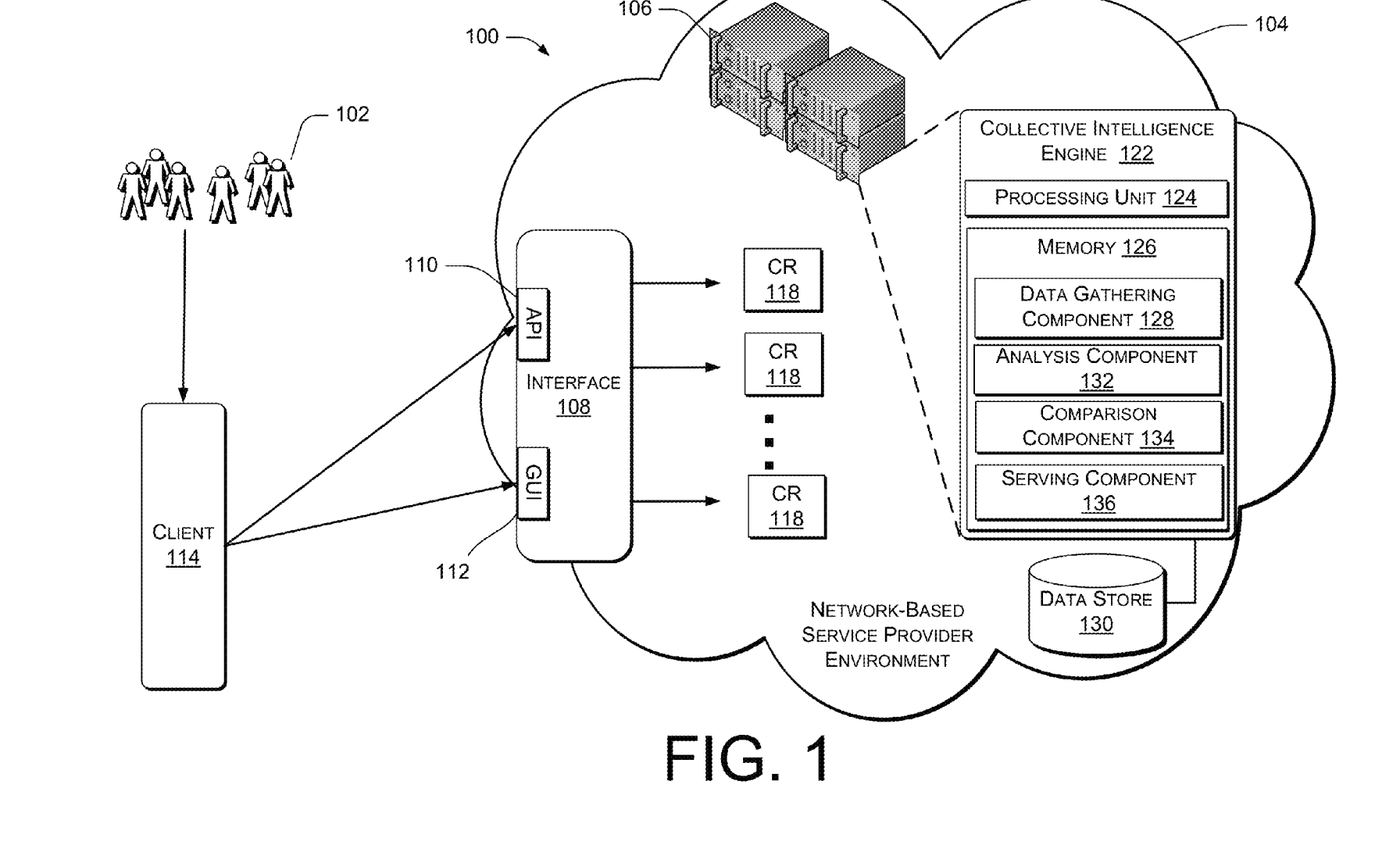
FIG. 1 illustrates an example environment within which data may be gathered and analyzed to generate collective intelligence information used to improve customers' network-based service experience.

FIG. 1 illustrates an environment 100 for a network-based service architecture that may be used by one or more customers 102. The environment of FIG. 1 includes a network-based service provider environment 104 that provides and operates multiple network-based services that can be used by users or customers 102. The network-based services may be referred to as Infrastructure as a Service (IaaS) and/or Platform as a Service (PaaS).

The network-based service provider environment 104 may implement services with servers or other physical equipment 106, the physical equipment 106 including, for example, computers, processors, memory, data storage, network equipment, and so forth. Based on the physical equipment 106, the network-based service provider environment 104 may provide compute services, storage services, database services, etc. The services provided by the network-based service provider environment 104 may be available in scalable increments or amounts, which can dynamically increase or decrease in response to usage and/or demand. Service fees may tie to the amount of the service that customers actually use.

Functional components may be included in the network-based service provider environment and may relate to network communications and other services or activities. Network-related services may, for example, include firewalls, load balancers, filters, routers, and so forth. Additional functional components may be available for such things as graphics processing, language translation, searching, etc.

The various services and functionality provided by the network-based service provider environment 104 may reside on a control plane comprising components that run in the network-based service provider environment 104 and are used by the service provider to manage the various computer systems operating within the service provider environment as well as perform certain actions on behalf of the customers 102. The services and functionality may be exposed to customers 102 through various forms of network-based interfaces, which in FIG. 1 are represented as being implemented by an interface 108. The interface 108 may comprise an administrative component or service implemented by the equipment 106 of the network-based service provider environment 104.

The interface 108 may expose various application programming interfaces (APIs) 110 that can be programmatically accessed by remote or external devices and users to establish and execute many of the services and functionality provided by the network-based service provider environment 104. For example, servers running in datacenters may be configured with local applications that interact with the interface 108 through the APIs 110, allowing users 102 to create or instantiate computer resources 118 operated by the network-based service provider environment 104. Computer resources 118 may comprise compute nodes of various types and configurations that may be used to implement various services offered by a service provider, including, but not limited to, cloud computing services, network-based storage services, network-based database services, web hosting services, and the like. The interface 108 may also, or alternatively, expose a graphical user interface (GUI) 112 for interactive access by users 102 of the network-based service provider environment 104. For example, the GUI 112 may comprise an Internet-based web server or hypertext-markup-language (HTML) server, which may in turn implement a network-accessible website to allow users to browse or search catalogs of computer resources 118 and similar products and services to be executed within the network-based service provider environment 104.

Users 102, which may include customers, may communicate with the network-based service provider environment 104 from a client 114, such as a computer, a mobile device, or other equipment. The client 114 may communicate with the network-based service provider environment 104 through the APIs 110 of the network-based service provider environment 104. The APIs 110 may be designed to support various client functions and communications, and may be accessible through local-area or wide-area networks, including the Internet.

In some cases, the client 114 may interact programmatically with the APIs 110 of the interface 108. For example, the client 114 such as a computer system running in a customer's datacenter may execute one or more programs that issue network-based API calls to the interface 108 specifying desired actions or queries, based on information received from or specified by a user. In other cases, the client 114 may implement a graphical browser, such as an Internet browser, through which a user may access the services of the network-based service provider environment 104. More specifically, such a browser may communicate with the GUI 112 of the interface 108 in response to interactive instructions, selections, and data entry by the user. In response to the client 114, the interface 108 and/or control plane components may create or implement one or more computer resources 118. Each computer resource 118 may reside in a data plane of the network-based service provider environment 104 and may be based on a machine image that is provided or specified by the client 114.

For any given customer that uses services of the network-based service provider environment 104 shown in FIG. 1, the experience received by that customer depends on a number of parameters. These parameters can be categorized into two main categories in some instances. The first category includes parameters associated with characteristic(s) of a computer resource(s) 118 that a customer desires to use. The term "characteristic", as used in the context of computer resources 118 herein, includes a type(s) or a configuration(s) of a computer resource(s) 118. For example, computer resources 118, such as virtual machines, may be of various types in terms of processing capacity, memory, storage, etc., and virtual machines may also have various configurations that define, for example, a region specified by the customer for launching virtual machines, security characteristics, network access characteristics, version of operating system, and similar parameters related to customer controlled configurations and settings.

The second category of parameters includes parameters associated with a state of the network-based service provider environment 104, which may include, but are not limited to, proximity to another user(s) or another computer resource(s) 118 of the network-based service provider environment 104, the number of users consuming resources of the network-based service provider environment 104 at any given time, the demand or level of usage that is being placed on the physical equipment 106 at any given time, and similar parameters.

Various permutations of the parameters within the two aforementioned categories will at least partly dictate the performance characteristics of the network-based services that any given customer experiences. Such customer experiences include, for example, a time period required to generate a password for the customer upon creation of a virtual machine, or a time period to launch the virtual machine. Furthermore, the parameters associated with the characteristics of computer resources 118 are often defined by the customers themselves and are not controlled by the service provider hosting the network-based service. Therefore, there is a randomness associated with the usage of these network-based service provider environments whereby the service provider cannot always predict and tell its customers 102 exactly what their experience is going to be, or provide quality recommendations to its customers 102 regarding products and/or services (e.g., machine images, virtual machine instances, etc) due to the lack of control over these parameters.

Accordingly, disclosed herein are systems, devices, and techniques for using collective intelligence to improve a customer's experience when using network-based services. When a customer uses network-based services by, for example, creating, launching, or terminating virtual machines or interacting with services offered by the service provider, data is generated as a byproduct of the customer's use of the network-based services and this generated data may be gathered and analyzed using collective intelligence methodologies. The general concept of collective intelligence makes use of information collected from a user base, the user base being, for example, the users of a social networking site, a network-based service (e.g., cloud computing service), etc. Accordingly, the generated data may be collected and analyzed to generate collective intelligence information which may then be utilized for various purposes including, but not limited to, determining a more accurate prediction of a subsequent customer experience, provisioning access credentials for computer resources 118, recommending products or services to customers, or rating products or services for customers. Products and services as used herein refer to software and virtual hardware products that may generally be used in a network-based service provider environment 104, including, but not limited to, computer resources 118 such as machine images, virtual machine instances, and the like. Furthermore, it is to be appreciated that all or a portion of the gathered data may be analyzed for utilization in improving the experience of customers 102. Using collective intelligence in the context of network-based services may enable a third party host of such services to guide their customer base and alter the customers' experience in a way that is likely to increase customer satisfaction.

With reference again to FIG. 1, the network-based service provider environment 104 may further include a collective intelligence engine 122 to provide the aforementioned collective intelligence function for improving a given customer's experience when using network-based services. The collective intelligence engine 122 may be implemented by the equipment 106 of the network-based service provider environment 104 and comprises one or more processing units 124 and one or more forms of computer-readable memory 126. The memory 126 may comprise volatile and nonvolatile memory. Thus, the memory 126 may include, but is not limited to, RAM, ROM, EEPROM, flash memory, or other memory technology, or any other medium which can be used to store applications and data. The memory 126 may also include removable media such as optical disks, portable devices/drives, and so forth. The memory 126 may be used to store any number of functional, or executable, components, such as programs and program modules that are executable on the processing unit 124. Each component stored in the memory 126 may comprise computer-executable instructions that, when executed, cause the one or more processing units 124 to perform acts and to implement techniques described herein.

Accordingly, the memory 126 comprises a data gathering component 128 configured to repeatedly, or continuously, gather data that is generated by services, users, or customers 102, when using (i.e., interacting with the network-based service provider environment 104, creating and destroying computer resources 118, and the like) the network-based service provider environment 104. The data gathering component 128 may operate by calling individual services provided by the network-based service provider environment 104, collecting log files, gathering data that is a byproduct of a control plane API used to initiate and mutate customer resources, gathering API calls (e.g., "run instance"), gathering data generated at the data plane level, or data indicating that passwords or login names were generated, etc. Accordingly, the data gathering component may gather data generated at the control plane, the data plane, or throughout the network-based service provider environment 104. The data that is generated from a customer's use of the network-based service may include, but is not limited to, options selected by the customer, details of booting, creating, launching, and/or terminating a computer resource 118 (e.g., such as running time, a type or amount of traffic received, a launch count or number of customers of a computer resource 118), and similar data.

This gathered data may be stored in a data store 130. The data store 130 may comprise volatile and nonvolatile memory. Thus, the data store 130 may include, but is not limited to, RAM, ROM, EEPROM, flash memory, or other memory technology, or any other medium which can be used to store data. The data store 130 may also include removable media such as optical disks, portable devices/drives, and so forth, or arrays of such storage media such as disk arrays, RAID systems, etc.

Once the data is gathered by the data gathering component 128 and optionally stored in the data store 130, an analysis component 132 may access at least a portion of the data either directly from the data gathering component 128, or from the data store 130, and is configured to analyze, or otherwise process, the gathered data in order to create collective intelligence information which is also optionally stored in the data store 130. A comparison component 134 is configured to assess a first parameter(s) associated with a characteristic (i.e., a type or a configuration) of a computer resource(s) 118 that the customer is using or that is presented in an electronic catalog or online marketplace. The comparison component 134 is further configured to assess a second parameter(s) associated with a state of the network-based service provider environment 104 at the given time. The comparison component 134 additionally references the collective intelligence information created by the analysis component 132 and compares the assessed first and second parameter(s) to the collective intelligence information which may be utilized in a number of ways to improve customer experience of a user, or customer, using a network-based service. For example, information that may be obtained based on the comparison includes a prediction of a customer experience (e.g., password generation times), access credentials for using computer resources 118 (e.g., machine images, virtual machines, etc.), product and/or service recommendations or ratings, etc. Finally, a serving component 136 sends a message to, or otherwise notifies a customer through the interface 108, with the message being associated with the information obtained from the comparison. For instance, the message may indicate an estimated amount of time for the network-based service provider environment 104 to generate a password, may recommend or rate a product or service, may provide access credentials to the user, or the like.

Example Processes

Figure 2:
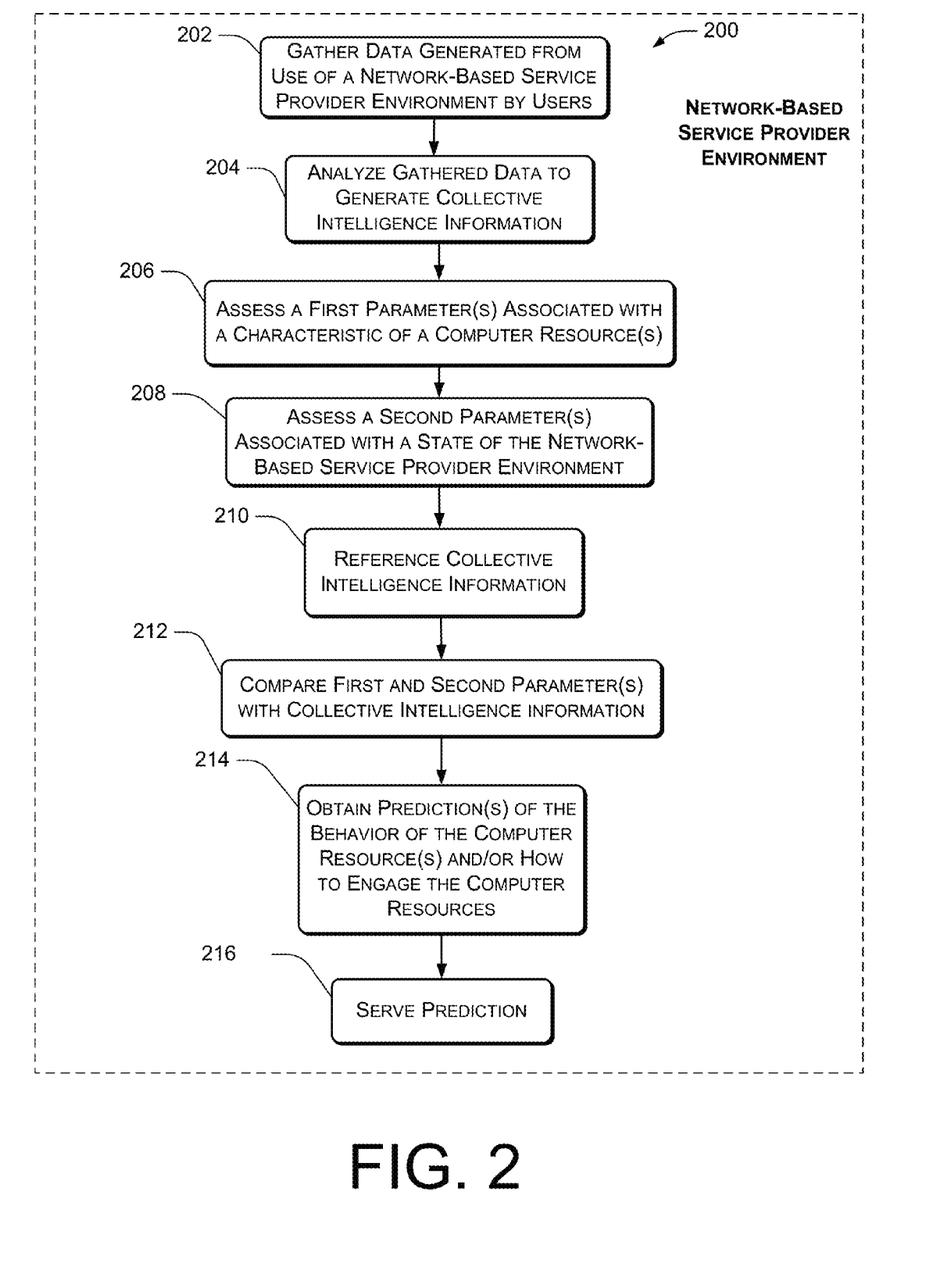
FIG. 2 illustrates an example process that the architecture of FIG. 1 may implement to improve customers' experiences by utilizing collective intelligence information.

FIG. 2 illustrates an example process 200 that may be performed by, or in conjunction with, the network-based service provider environment 104 to obtain information for a customer using a network-based service. For example, the process 200 may determine a prediction of a customer experience, accurate access credentials for using computer resources 118, ratings for computer resources 118, and the like. This process (as well as other processes described throughout) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Although the process is described in the context of the network-based service provider environment 104, the process may also be implemented in other environments, such as in private or user-owned installations.

The process 200 may entail actions performed by the network-based service provider environment 104. An action 202, which may be performed by the data gathering component 128, may comprise gathering data that is generated by services, users, or customers 102, when using (i.e., interacting with the network-based service provider environment 104, creating and destroying computer resources 118, and the like) the network-based service provider environment 104. This may be done in the manner described above with reference to the data gathering component 128 of FIG. 1. At 204, the gathered data is analyzed, or otherwise processed, by the analysis component 132, as described above, in order to create collective intelligence information.

At 206, a first parameter(s) associated with a characteristic of a computer resource(s) 118 (e.g., a computer resource 118 specified by a customer) is assessed. For example, the type of the computer resource(s) 118 in terms of resources, or the computer resource(s) 118 configurations defining the specified region for launching the computer resource(s) 118, security characteristics, network access characteristics, or the operating system version may be assessed at 206. At 208, a second parameter(s) associated with a state of the network-based service provider environment 104 is assessed. For example, the proximity of other user(s) or other computer resource(s) 118 of the network-based service provider environment 104, and/or the number of users or demand being placed on the physical equipment 106 may be assessed at 208. At 210, at least a portion of collective intelligence information that was generated from analysis of gathered data is referenced. Such collective intelligence information may include, but is not limited to, previous usage data of the same or a similar computer resource 118, information relating to the login experience of previous customers, a number of customers who have logged in with a particular login name to a same or similar computer resource 118, running time, a type or amount of traffic received, a launch count, number of customers, or similar information or characteristics of a computer resource 118, etc.

At 212, the collective intelligence information referenced in 210 is compared with the first and second parameters assessed in 206 and 208, respectively. This comparison may be based on any suitable algorithm given the nature of the data, such as a data counting techniques (e.g., counting the number of times a particular user name was used for a given computer resource 118 and selecting the user name with the highest number count), or a clustering algorithm (e.g. K-means algorithm). Additionally, or alternatively, weights may be assigned to data points in the collective intelligence information wherein the weighting is based on a similarity metric between the assessed parameters and the collective intelligence information. For example, the referenced collective intelligence information may include information relating to past use of the same or similar computer resource 118 in a same or similar region.

At 214, a prediction of a behavior of the computer resource 118 and/or how a customer is to engage the computer resource 118 is obtained. For example, a customer experience may be obtained, or access credentials (e.g., a login name) for using a computer resource 118 may be obtained. Upon obtaining the prediction at 214, the prediction may be communicated, or served, such as by messaging or otherwise displaying a notification for the customer(s) at 216. Consequently, a third party host of network-based services may be able to more accurately predict the customer experience that is to be expected for a given customer based on the process of FIG. 2. In other words, the default customer experience message may be refined to provide enhanced customer service.

Figure 3:
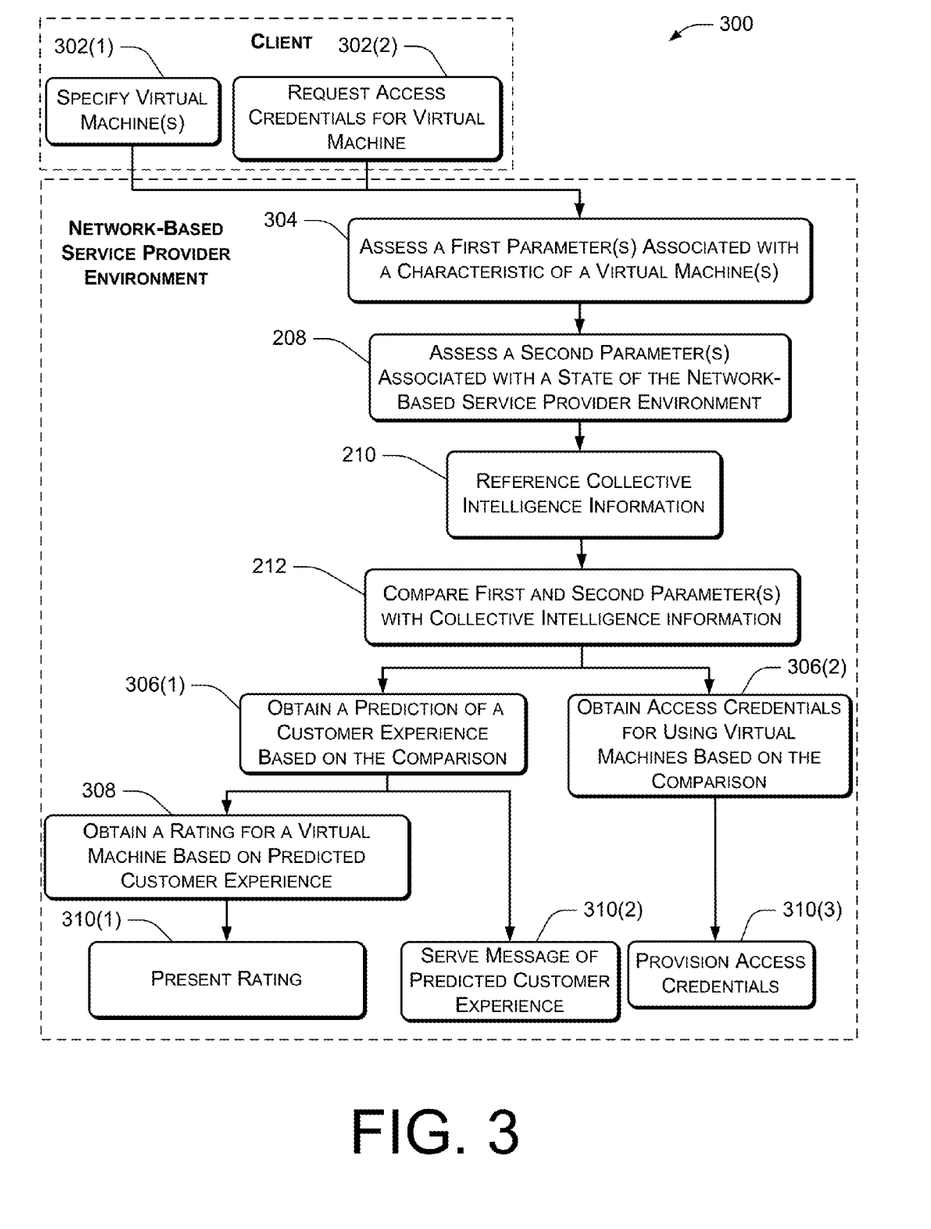
FIG. 3 illustrates an example process that the architecture of FIG. 1 may implement to improve customers' experiences by utilizing collective intelligence information.

FIG. 3 illustrates an example process 300 that may be performed by, or in conjunction with, the network-based service provider environment 104 to obtain accurate, or high quality, information for a customer using a network-based service. For example, the process 300 may obtain an accurate prediction of a customer experience, accurate access credentials for using computer resources 118, high quality ratings for computer resources 118, and the like. Although the process is described in the context of the network-based service provider environment 104, the process may also be implemented in other environments, such as in private or user-owned installations.

The process 300 may entail actions performed by a client computing device operated by a user and actions performed by the network-based service provider environment 104. An action 302, which may be performed by a client device of a user or customer of the network-based service provider environment 104, may comprise a specification or request from the customer. The network-based service provider environment 104 may receive this specification or request from the client device. In one example, at 302(1) a customer may specify one or more virtual machines to be instantiated by the network-based service provider environment 104. In addition, or alternatively, a customer may request access credentials 302(2) for a virtual machine. Provisioning accurate access credentials is sometimes a difficult task for third party hosts of network-based services due to the nature of shared machine images (also known as "community machine images") which may be associated with a plurality of access credentials. Such access credentials are usually not stored by the third party host of the network-based service on which the virtual machine is used. Therefore, the third party host of the network-based service does not control the generation, storage or retrieval of these access credentials.

At 304, a first parameter(s) associated with a characteristic of a virtual machine(s) (e.g., the virtual machine specified by the customer at 202(1)) is assessed. For example, the type of the virtual machine(s) in terms of resources, or the virtual machine(s) configurations defining the specified region for launching the virtual machine(s), security characteristics, network access characteristics, or the operating system version may be assessed at 304. In a similar manner to that of process 200, at 208, a second parameter(s) associated with a state of the network-based service provider environment 104 is assessed. For example, the specifications of, or number of users or demand being placed on, the physical equipment 106, and/or the manner in which hard drives are persisted may be assessed at 208. At 210, at least a portion of collective intelligence information that was generated from analysis of gathered data is referenced. Such collective intelligence information may include, but is not limited to, previous usage data of the same or a similar virtual machine, information relating to the login experience of previous customers, a number of customers who have logged in with a particular login name to a same or similar virtual machine, running time, a type or amount of traffic received, a launch count, number of customers, or similar information or characteristics of a virtual machine, etc.

At 212, the collective intelligence information referenced in 210 is compared with the first and second parameters assessed in 304 and 208, respectively. This comparison may be based on any suitable algorithm given the nature of the data, such as a data counting techniques (e.g., counting the number of times a particular user name was used for a given virtual machine and selecting the user name with the highest number count), or a clustering algorithm (e.g. K-means algorithm). Additionally, or alternatively, weights may be assigned to data points in the collective intelligence information wherein the weighting is based on a similarity metric between the assessed parameters and the collective intelligence information. For example, the referenced collective intelligence information may include information relating to past use of the same or similar virtual machine in a same or similar region.

At 306, a prediction of a customer experience may be obtained, as shown at 306(1), or access credentials (e.g., a login name) for using a virtual machine may be obtained, as shown at 306(2). The prediction of the customer experience and the access credentials are based on the comparison at 212. Examples of customer experience predictions may be in regard to launch times for virtual machines, password generation times, insertion function times for database services, cost or cost metrics associated with products and/or services, and similar customer experiences. Upon obtaining the prediction of a customer experience at 306(1), a rating for virtual machine is obtained at 308, the rating being based at least in part on the obtained prediction of the customer experience. This rating may then be communicated, or served, such as by messaging or otherwise displaying a notification for the customer(s) at 310(1). Furthermore, the process 300 may be a recursive method whereby multiple ratings are obtained for each virtual machine that may be presented in an electronic catalog or online marketplace via relative rating/ranking among the products and/or services.

Alternatively, upon obtaining the prediction of a customer experience at 306(1), the process 300 may proceed directly to 310(2) where the prediction of a customer experience may be communicated, or served, such as by messaging or otherwise displaying a notification for the customer(s). Similarly, upon obtaining the access credentials at 306(2), the access credentials may be communicated, or served, such as by messaging or otherwise displaying a notification for the customer(s) at 310(3). Consequently, a third party host of network-based services may be able to more accurately predict the customer experience that is to be expected for a given customer, more accurately provision access credentials to a given customer, or present ratings of computer resources 118 based on the process of FIG. 3. In other words, the default customer experience message may be refined to provide enhanced customer service.

In a non-limiting example scenario to further illustrate the processes of FIGS. 2 and 3, when a customer creates a virtual machine instance, a password for the virtual machine instance will be generated and encrypted after a time period. This time period for generating and encrypting the password may depend on parameters associated with the characteristic of the virtual machine instance. The time period may also depend on parameters associated with the state of the network-based service provider environment 104. Therefore, by comparing these parameters (which may be assessed at the time the customer creates the virtual machine instance) with collective intelligence information comprising the same or similar parameter information based on previous customer usage data, a prediction of the time period required for generating and encrypting the customer's password may be obtained and served to the customer.

In another non-limiting example, suppose a customer is browsing an electronic catalog or online marketplace of products or services (e.g., virtual machines) of varying characteristics. The customer may find it helpful for products to be presented by a rating system in order to give them information on the best products and services available to suit the customer's needs. In accordance with disclosed systems and techniques, customers 102 may be given an accurate indication of the predicted customer experience upon the purchase/rental of a given product and/or service at a given time, and in real-time as they browse the products and/or services. More specifically, if a customer wants to buy a given computer resource 118 at a given time, the network-based service provider environment 104 can display or output precisely what sort of customer experience the customer will receive before buying the machine image at that time. Furthermore, customers may search and sort products and/or services in the catalog or online marketplace based on the ratings obtained using collective intelligence techniques as described in processes 200 and 300. Lastly, the processes 200 and 300 may be repeatedly and frequently executed such that a customer browsing a catalog or marketplace of products and/or services will be presented with up-to-date ratings of the products and/or services.

Figure 4:
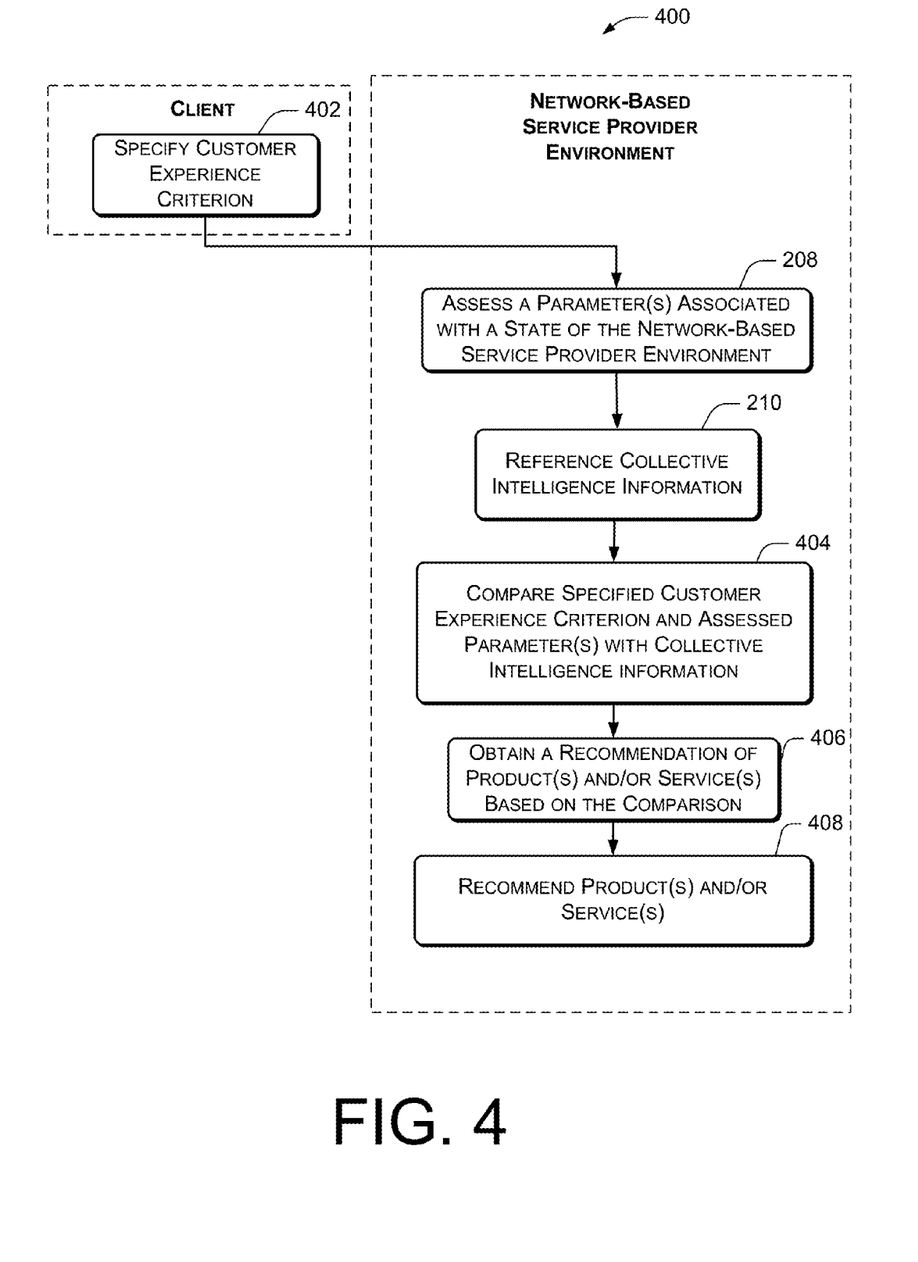
FIG. 4 illustrates an example process that the architecture of FIG. 1 may implement to provide recommendations of products and/or services to customers upon receiving a customer experience criterion from a customer, with the recommendations being based upon collective intelligence information.

Referring now to FIG. 4, embodiments are disclosed for using collective intelligence to provision high quality recommendations of products and/or services to customers of network-based services. Products and services as used herein refer to software and virtual hardware products that may generally be used in a network-based service provider environment 104, including, but not limited to, computer resources 118 (e.g., machine images, virtual machine instances, etc.). FIG. 4 illustrates an example process 400 that may be performed by or in conjunction with, the network-based service provider environment 104. Although the process is described in the context of the network-based service provider environment 104, the process may also be implemented in other environments, such as in private or user-owned installations.

An action 402 may comprise specifying a customer experience criterion, or criteria, relating to performance characteristics. Such customer experience criteria may include, but are not limited to, a desired time period for generation of passwords or for the launch of a computer resource(s) 118, and similar customer experience criteria. This action may be performed by a client device of a user or customer of the network-based service provider environment 104 and may be performed in response to a request to the customer to specify customer experience parameters in response to creating a computer resource(s) 118 which may not yet be configured. The network-based service provider environment 104 may accordingly receive the specified customer experience criterion.

Similar to the process 200 as described in FIG. 2, a parameter(s) associated with a state of the network-based service provider environment 104 is assessed at 208, and collective intelligence information is referenced at 210. At 404, the specified customer experience criterion and the assessed parameter(s) associated with the state of the network-based service provider environment 104 are compared with the referenced collective intelligence information. The comparison in 404 may be based on any suitable algorithm given the nature of the data, such as data counting techniques, or clustering algorithms, as described above. Additionally, or alternatively, weights may be assigned to data points in the collective intelligence information wherein the weighting is based on a similarity metric between the criterion specified by the customer at 402, the parameter assessed at 208, and the collective intelligence information referenced in 210. For example, past launches of computer resources 118, such as virtual machines, corresponding to similar customer experience criterion and system state parameters to those assessed in 402 and 208, respectively, may be referenced and used in the comparison step 404 to obtain a recommendation of a particular type of computer resource(s) 118 with particular configurations. At 406 a recommendation of one or more products and/or services with characteristics that will result in customer experiences similar, or superior, to the customer experience criterion specified by the customer are obtained based on the comparison at 404. More specifically, at least one particular type or configuration for a computer resource(s) 118 recommended for the customer to receive the specified customer experience criterion can be obtained at 406. At 408, the recommendation of the product(s) and/or service(s) may then be communicated, or served, such as by messaging or otherwise displaying a notification for the customer.

Example Marketplace Interface

Figure 5:
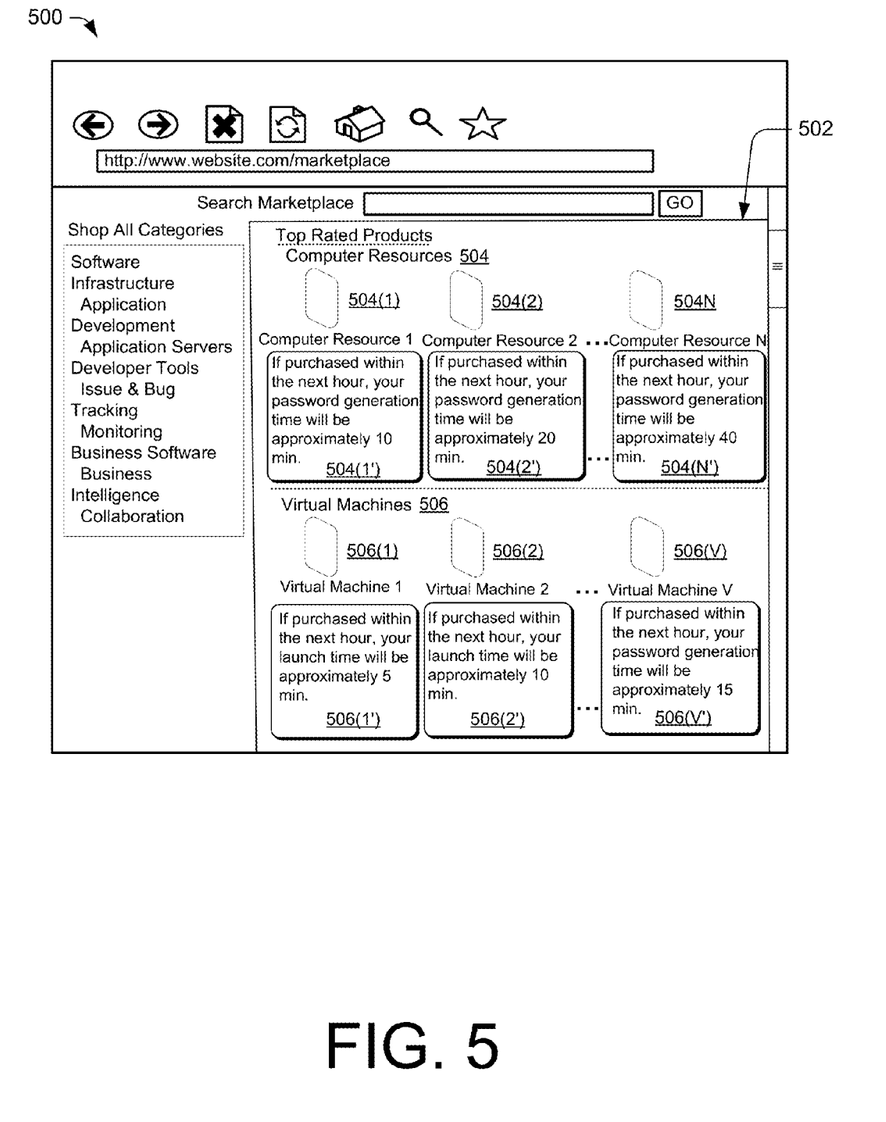
FIG. 5 illustrates an example user interface for an electronic catalog or online marketplace for serving customers with product and/or service ratings and a prediction of a customer experience.

FIG. 5 illustrates an example user interface 500 for an online marketplace or an electronic catalog (e.g., a retail website on the Internet) that a customer may interface with to search for, or browse, products and/or services that they can purchase or rent in order to use the products and/or services with a network-based service. User interface 500 comprises a presentation window 502 listing the top rated products and/or services in the online marketplace or electronic catalog. The listing of top rated products may comprise various categories of products with varying characteristics (i.e., types and configurations), such as categories 504 and 506 which are product listings of computer resources and virtual machines, respectively. Each product 504(1)-504(N) and 506(1)-506(V) is listed in a ranked order (FIG. 5 shows products ranked from left to right in the presentation window 502 where the leftmost product is the top-rated product). Each product is also presented along with a message of a predicted customer experience 504(1')-504(N') and 506(1')-506(V') (e.g. "If purchased within the next hour, your password generation time will be approximately 10 min."). This presentation is enabled by the systems, devices and techniques described above for using collective intelligence to provision high quality ratings of products and/or services, as well as accurate predictions of a customer experience, to customers 102 of network-based services. For example, the prediction stating that it will take approximately ten minutes to generate a password may be based on the amount of time that it has taken to generate other passwords for other similar instances, the state of the network-based service provider environment 104 at those times, and the current state of the network-based service provider environment 104.

Figure 6:
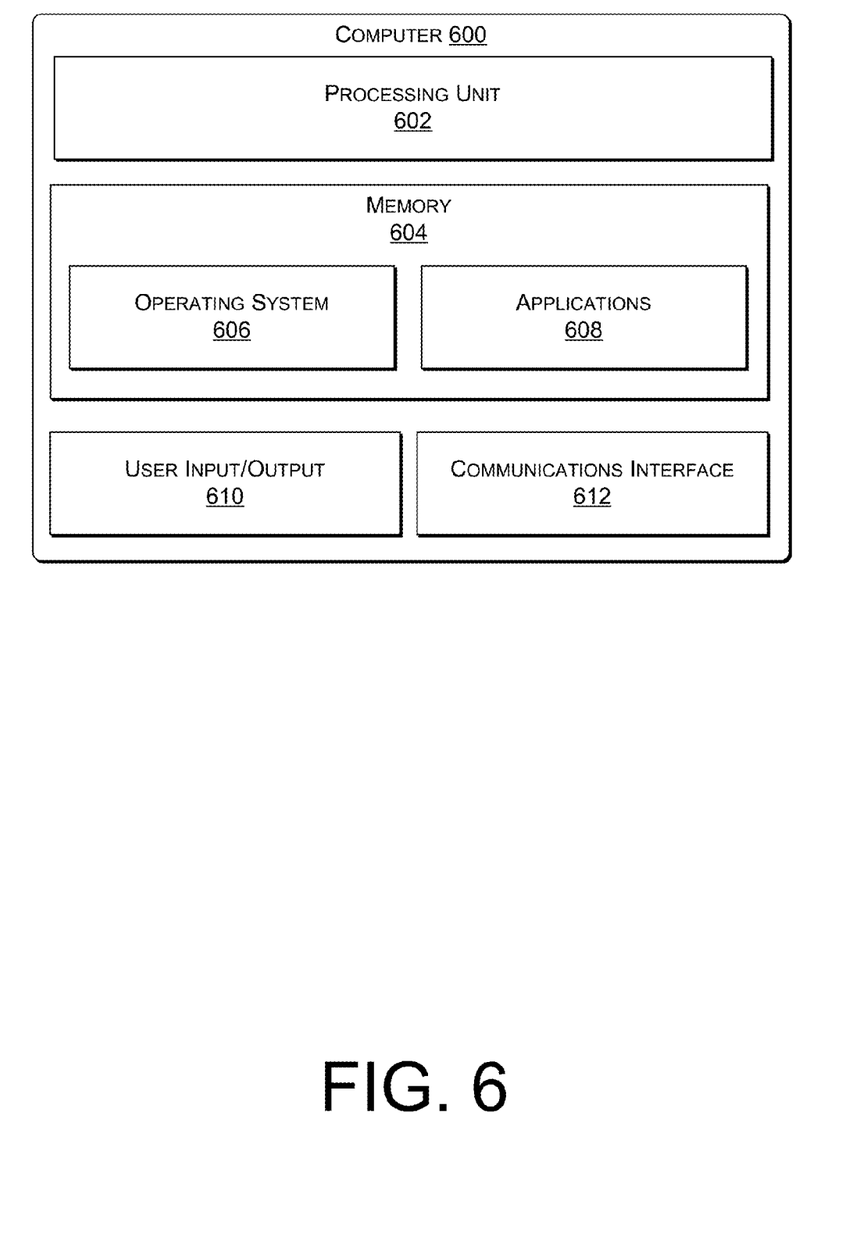
FIG. 6 is a block diagram showing high-level components of an example computer that may be used in conjunction with the systems and techniques described herein.

FIG. 6 shows relevant components of an example computer 600 that may be used to implement physical servers of the network-based service provider environment 104 and/or to implement the client 114. The physical servers of the network-based service provider environment 104 and the client 114 may of course be implemented in many different ways.

Note that the client 114 comprises any number of various devices that may be used to access network-based services, such as desktop computers, notebook computers, tablet computers, terminals, personal digital assistants (PDAs), smartphones, gaming devices, entertainment devices, industrial controllers, and so forth.

The example computer 600 may comprise one or more processing units 602 and one or more forms of computer-readable memory 604. The memory 604 may comprise volatile and nonvolatile memory. Thus, the memory 604 may include, but is not limited to, RAM, ROM, EEPROM, flash memory, or other memory technology, or any other medium which can be used to store applications and data. The memory 604 may also include removable media such as optical disks, portable devices/drives, and so forth.

The memory 604 may be used to store any number of functional components, such as programs and program modules that are executable on the processing unit 602. For example, the memory may store an operating system 606 and various applications or user-specified programs 608. The operating system 606 and/or the user-specified programs 608 may include components, modules, and/or logic for performing the actions described herein. More specifically, executable components stored in the memory 604 may comprise computer-executable instructions that, when executed, cause the one or more processing units 602 to perform acts and to implement techniques described herein.

The computer 600 may also have user input/output components 610, such as a display, keyboard, mouse, etc. The computer 600 may also comprise a communications interface 612 such as a network interface.

Generally, the functionality described herein may be implemented by one or more computers such as shown by FIG. 6 or by similar devices, with the various actions described above distributed in various ways across the different computers. Computers of the network-based service provider environment 104 may be located together or separately, and organized as virtual servers, server banks, and/or server farms. The described functionality may be provided by the computers of a single entity or enterprise, or may utilize the computers and/or services of multiple entities or enterprises.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
memory, accessible by the one or more processors, including instructions that upon execution cause the system to:
access data generated from use of a network-based service provider environment by a plurality of users;
analyze the data and to generate collective intelligence information based at least in part on the analysis of the data;
compare at least a first portion of the collective intelligence information with a first parameter, the first parameter being associated with a characteristic of a virtual machine, and compare at least a second portion of the collective intelligence information with a second parameter, the second parameter being associated with a state of the network-based service provider environment; and
serve a message to a user of the network-based service provider environment, the message including information based at least in part on the comparison of the first portion of the collective intelligence information with the first parameter and the comparison of the second portion of the collective intelligence information with the second parameter.

2. The system as recited in claim 1, wherein a result obtained from the comparison of the first portion of the collective intelligence information with the first parameter and the comparison of the second portion of the collective intelligence information with the second parameter comprises a prediction of an experience of the user with the network-based service provider environment.

3. The system as recited in claim 2, wherein the instructions further cause the system to obtain a rating for the virtual machine, the rating being based at least in part on the prediction, wherein the message is associated with the rating.

4. The system as recited in claim 2, wherein the result obtained from the comparison of the first portion of the collective intelligence information with the first parameter and the comparison of the second portion of the collective intelligence information with the second parameter comprises an access credential for using the virtual machine.

5. The system as recited in claim 1, wherein the instructions further cause the system to access the data by at least one of calling individual services provided by the network-based service provider environment, collecting log files, gathering data that is a byproduct of a control plane application programming interface (API), gathering API calls, or gathering data indicating that access credentials were generated.

6. The system as recited in claim 1, wherein the network-based service provider environment enables providing at least one of a compute service, a network-based storage service, a network-based database service, or a web hosting service.

7. The system as recited in claim 1, wherein the instructions further cause the system to utilize at least one of a data counting algorithm or a clustering algorithm to perform the comparison of the first portion of the collective intelligence information with the first parameter and the comparison of the second portion of the collective intelligence information with the second parameter.

8. The system as recited in claim 1, wherein the collective intelligence information comprises at least one of information relating to a login experience of previous customers, previous usage data of a particular virtual machine, a number of customers who have logged in with a particular access credential to the particular virtual machine, running time of the particular virtual machine, an amount of traffic received by the particular virtual machine, or a launch count of the particular virtual machine.

9. The system as recited in claim 1, wherein serving the message comprises causing a display of the message via a graphical user interface of an online marketplace for acquiring virtual machines.

10. A method to be executed on a computing device, the method comprising:
assessing a first parameter associated with a characteristic of a virtual machine;
assessing a second parameter associated with a state of a network-based service provider environment;
referencing collective intelligence information, the collective intelligence information generated from analysis of data associated with prior use of the network-based service provider environment by a plurality of users;
comparing at least a portion of the collective intelligence information with the first and second parameters to obtain a result; and
serving a message to a user associated with the virtual machine, the message being associated with the result obtained from the comparing.

11. The method as recited in claim 10, wherein the result comprises a prediction of an experience of the user on the network-based service provider environment.

12. The method as recited in claim 11, further comprising obtaining a rating for the virtual machine, the rating being based at least in part on the prediction, wherein the message is associated with the rating.

13. The method as recited in claim 10, wherein the serving the message comprises causing a display of the message via a graphical user interface of an online marketplace for acquiring virtual machines.

14. The method as recited in claim 10, wherein the message is served in response to a request from the user specifying the virtual machine.

15. The method as recited in claim 10, further comprising receiving a request to obtain an access credential for the virtual machine from the user, wherein the serving the message occurs at least partly in response to the receiving the request, and wherein the result comprises the access credential.

16. The method as recited in claim 10, wherein the first parameter is associated with at least one of a type or a configuration of the virtual machine.

17. The method as recited in claim 10, wherein the second parameter comprises at least one of proximity to another user or another virtual machine of the network-based service provider environment, a number of users of the network-based service provider environment, or usage demand placed on the network-based service provider environment.

18. One or more non-transitory computer-readable media storing computer-executable instructions that, when executed, cause one or more processors to perform acts comprising:

receiving a customer experience criterion from a customer of a network-based service provider environment;

assessing a parameter associated with a state of the network-based service provider environment;

referencing collective intelligence information, the collective intelligence information generated from analysis of data associated with prior use of the network-based service provider environment by a plurality of customers;

comparing at least a portion of the collective intelligence information with the parameter and the customer experience criterion;

obtaining a recommendation of a computer resource based at least in part on the comparing; and serving the recommendation to the customer.

19. The one or more non-transitory computer-readable media as recited in claim 18, wherein the computer resource is associated with a characteristic that satisfies the customer experience criterion.

20. The one or more non-transitory computer-readable media as recited in claim 19, wherein the computer resource comprises a virtual machine and wherein the recommendation is a recommendation for the virtual machine, wherein the characteristic is at least one of a region for launching the virtual machine, a security characteristic of the virtual machine, or a network access characteristic of the virtual machine.

21. The one or more non-transitory computer-readable media as recited in claim 18, wherein the parameter associated with the state of the network-based service provider environment comprises at least one of proximity to another user or another computer resource of the network-based service provider environment, a number of users of the network-based service provider environment, or usage demand placed on the network-based service provider environment.

22. The one or more non-transitory computer-readable media as recited in claim 18, wherein the comparing comprises utilizing at least one of a data counting algorithm or a clustering algorithm.

23. The one or more non-transitory computer-readable media as recited in claim 18, wherein the collective intelligence information comprises a plurality of data points created from the analysis of the data associated with the prior use of the network-based service provider environment by the plurality of customers, and wherein the comparing comprises assigning weights to the data points, the weights to be used for selection of the portion of the collective intelligence information, and wherein the weights are assigned according to a similarity metric between each data point and both of the parameter associated with the state of the network-based service provider environment and the customer experience criterion.

24. The one or more non-transitory computer-readable media as recited in claim 18, wherein the customer experience criterion comprises at least one of a desired time period for generation of a password, or a desired time period for launching a computer resource.

\* \* \* \* \*